(12) United States Patent
Smith

(10) Patent No.: US 6,840,090 B2
(45) Date of Patent: Jan. 11, 2005

(54) PLUMBING TESTING DEVICES

(75) Inventor: Murray Douglas Smith, Langley (CA)

(73) Assignee: In Sync Mechanical Contracting Ltd., Langley (CA)

(*) Notice: Subject to any disclaimer, the term of this patent is extended or adjusted under 35 U.S.C. 154(b) by 86 days.

(21) Appl. No.: 10/240,541

(22) PCT Filed: Mar. 29, 2001

(86) PCT No.: PCT/CA01/00407

§ 371 (c)(1),
(2), (4) Date: Oct. 2, 2002

(87) PCT Pub. No.: WO01/75413

PCT Pub. Date: Oct. 11, 2001

(65) Prior Publication Data

US 2003/0074955 A1 Apr. 24, 2003

(30) Foreign Application Priority Data

Apr. 4, 2000 (CA) .............................................. 2303756

(51) Int. Cl.⁷ ........................... G01M 3/04; F16L 55/10
(52) U.S. Cl. ................. 73/49.8; 473/40.5 R; 473/49.5; 138/90; 138/91; 138/94
(58) Field of Search ................................. 73/49.5, 49.1, 73/40.5 R, 49.6, 49.8; 4/DIG. 7; 138/94, 89, 90, 91, 92

(56) References Cited

U.S. PATENT DOCUMENTS

| | | | | | |
|---|---|---|---|---|---|
| 755,082 | A | * | 3/1904 | Vanderman | ................... 138/90 |
| 1,451,644 | A | * | 4/1923 | Zachary | ................... 73/40.5 R |
| 1,558,161 | A | * | 10/1925 | Gunderson | ................... 138/90 |
| 1,573,410 | A | * | 2/1926 | McCabe et al. | ............... 138/90 |
| 1,985,813 | A | * | 12/1934 | Baden | ........................ 138/90 |
| 2,062,527 | A | * | 12/1936 | Postlewaite | ................. 73/49.5 |
| 4,103,537 | A | * | 8/1978 | Victor | ..................... 73/40.5 R |
| 4,542,642 | A | * | 9/1985 | Tagliarino | ................ 73/40.5 R |

FOREIGN PATENT DOCUMENTS

WO          WO 91/02186 A    *    2/1991

* cited by examiner

Primary Examiner—Michael Cygan

(57) ABSTRACT

A plumbing testing device (10) has a pair of aligned and closed pipe sections (12 and 14) with open sides facing in opposite directions. The plumbing testing device (10) is longitudinally collapsible to facilitate removal from between pipe ends (19 and 20). The pipe sections (12 and 14) each have a port (32, 35), a transparent hose (38) connects the ports to one another, and a valve (30) controls the flow of water between the pipe sections (12 and 14) through the hose (38).

9 Claims, 3 Drawing Sheets

PLUMBING TESTING DEVICES

TECHNICAL FIELD

The present invention relates to a plumbing testing device comprising a pair of aligned pipe sections having open sides facing in opposite directions, one of the pipe sections having a port and a valve controlling flow through the port.

BACKGROUND ART

The present invention is useful in particular, but not exclusively, for temporary installation in the piping system of a new building for the purpose of testing the plumbing system.

In the construction of a plumbing system within a new building, or when piping is added to any existing plumbing system, the authority having jurisdiction will require the plumbing system to be tested. This testing is intended to ensure that the plumbing system is leak free. In multi-storey buildings, it is necessary to test the plumbing system in vertical sections, usually covering four or five floors at once.

The usual procedure is to install a "Y" fitting at a lower end of a vertical section of the plumbing system being tested. The branch of the "Y" fitting is normally capped. When the plumbers wish to test the piping section directly above the "Y" fitting, they install an inflatable plug into the pipe through the "Y" fitting into the pipe and inflate the plug to provide a fluid-tight seal below the "Y" and the branch of the "Y" fitting.

The plumber then fills the piping above the inflatable plug with water, usually from the top or the next "Y" connection above. If the test is successful, the plumber then deflates the plug and removes it from the pipe, thus allowing test water to escape down into the downstream sewer piping within the building. The "Y" fitting piece is then capped and left in position, never to be used again, or may be removed with some difficultly and replaced by a section of pipe.

This method of testing is unreliable, since the inflatable plug tends to leak its air charge. Also, the positioning of the inflatable plug to maintain the test without leakage inside the pipe and/or out of the "Y" fitting branch connection can be difficult due to the plug length and varying piping arrangements. If the plumber decides to remove the test "Y" after testing, the result is a time-consuming procedure, due to the closeness of the adjacent piping ends, the weight of the pipe on the "Y" and the manipulation of the mechanical joint clamps required in order to allow removal of "Y" fitting. This method is also costly, because the plumber must purchase the "Y" fitting and its cap, or spend a difficult time removing the fitting and its cap for reuse, and must also purchase an inflatable plug to block the pipe and branch of the "Y", as well as a tool to inflate the plug.

Another plumbing testing device in use at the present time is a so-called "dumbbell", which has a pair of pipe sections connected by a central tube provided with a valve, the two pipe sections being at a fixed spacing from one another. In use, the dumbbell plumbing resting device is installed between two pipe ends of the piping to be tested and is sealed to these two pipe ends by mechanical joint couplings. When the testing has been completed, it is a disadvantage that this prior device is often difficult to remove from between the pipe ends and the joint couplings without damage to the device and/or the joint couplings.

In U.S. Pat. No. 4,932,241, issued Jun. 12, 1990 to Thurman J. Carmody et al., there is disclosed a test pipe for pressure testing piping systems including a main pipe section having top and bottom end portions and an internal closure preventing fluid flow therethrough. A valved first port in communication with the top end portion is connected by a bypass hose to a second port in communication with the bottom end portion. However, this prior art test pipe has the disadvantage, like the dumbbell device, that it is difficult to remove from between the pipe ends between which it is used.

DISCLOSURE OF INVENTION

According to the present invention, a plumbing testing device, comprising a pair of aligned and closed pipe sections having open sides facing in opposite directions, one of the pipe sections having port and a valve controlling flow through the port, is characterized in that the plumbing testing device is longitudinally collapsible to facilitate removal of the device from between pipe ends between which it is used.

The plumbing device according to the present invention eliminates the need for the plumber to purchase a "Y" fitting and adaptor and also an inflatable plug and its inflation device. This decreases the cost of testing the plumbing system. Also, since the plumbing testing device according to the present invention is longitudinally adjustable, it can be employed between a pair of pipe ends in a plumbing system and, when the testing has been completed, it can be longitudinally collapsed, thus enabling it to be easily and quickly removed, without damage, form between the pipe ends.

In a preferred embodiment of the present invention, the hose is transparent, so that the plumber can determine visually whether there is water in the hose and can thus ensure that drainage through the of the water used for testing the overlying piping has been completed.

Preferably, a longitudinally extendable and contractible connection is provided between the pipe sections, allowing the pipe sections to be moved adjustably towards and away from one another, and a releasable retainer releasibly secures the pipe sections at a predetermined spacing from one another.

The connection advantageously comprises telescopically interengaged tubular members between the pipe sections. The tubular members preferably comprise two laterally spaced pairs of telescopically interengaged tubular members.

BRIEF DESCRIPTION OF THE DRAWINGS

The invention will be more readily understood from the following description of a preferred embodiment thereof given, by way of example, with reference to the accompanying drawings, in which.

DESCRIPTION OF THE BEST MODE

Figure 1:
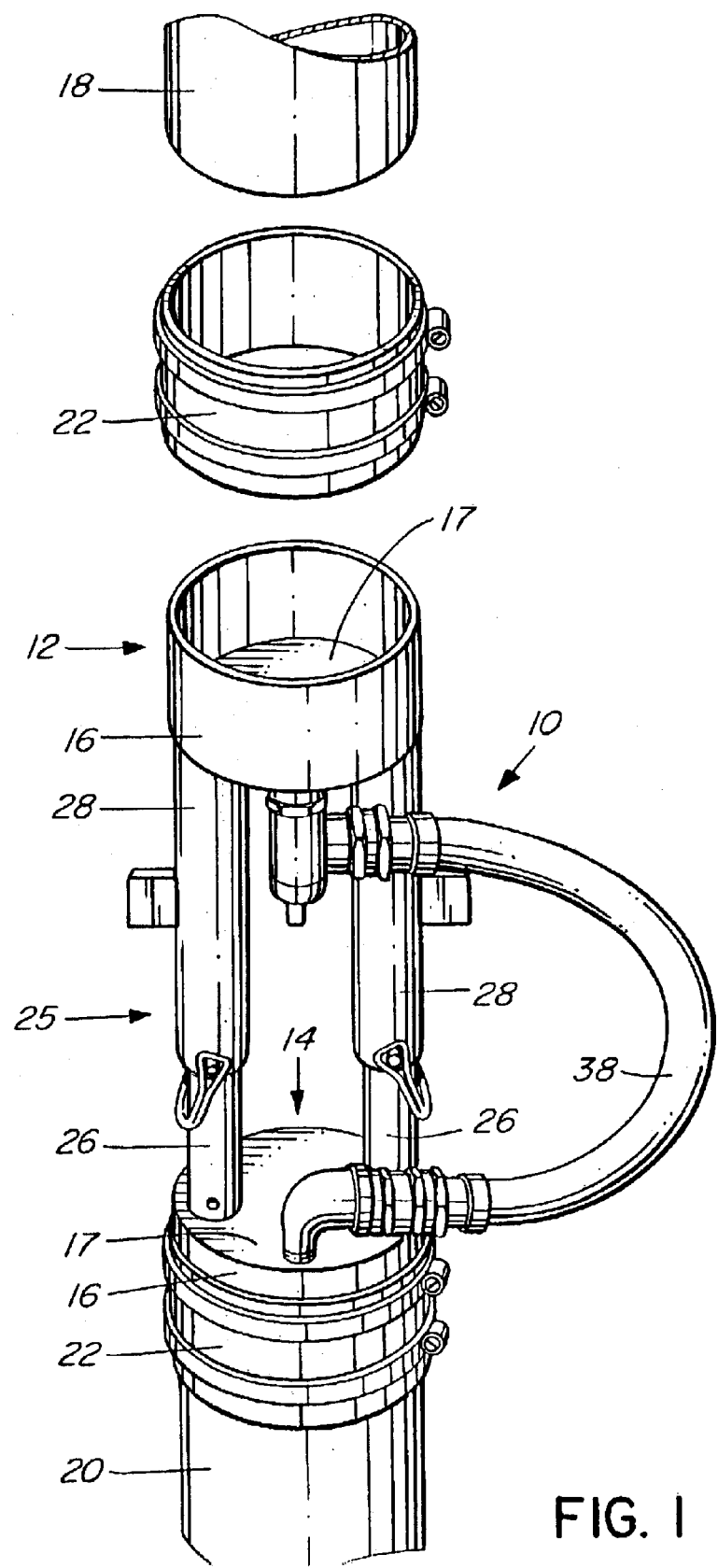
FIG. 1 shows a view in perspective of a plumbing testing device embodying the present invention, with a pair of a conventional pipe clamps and a pair of pipe ends forming part of a piping system.
Figure 2:
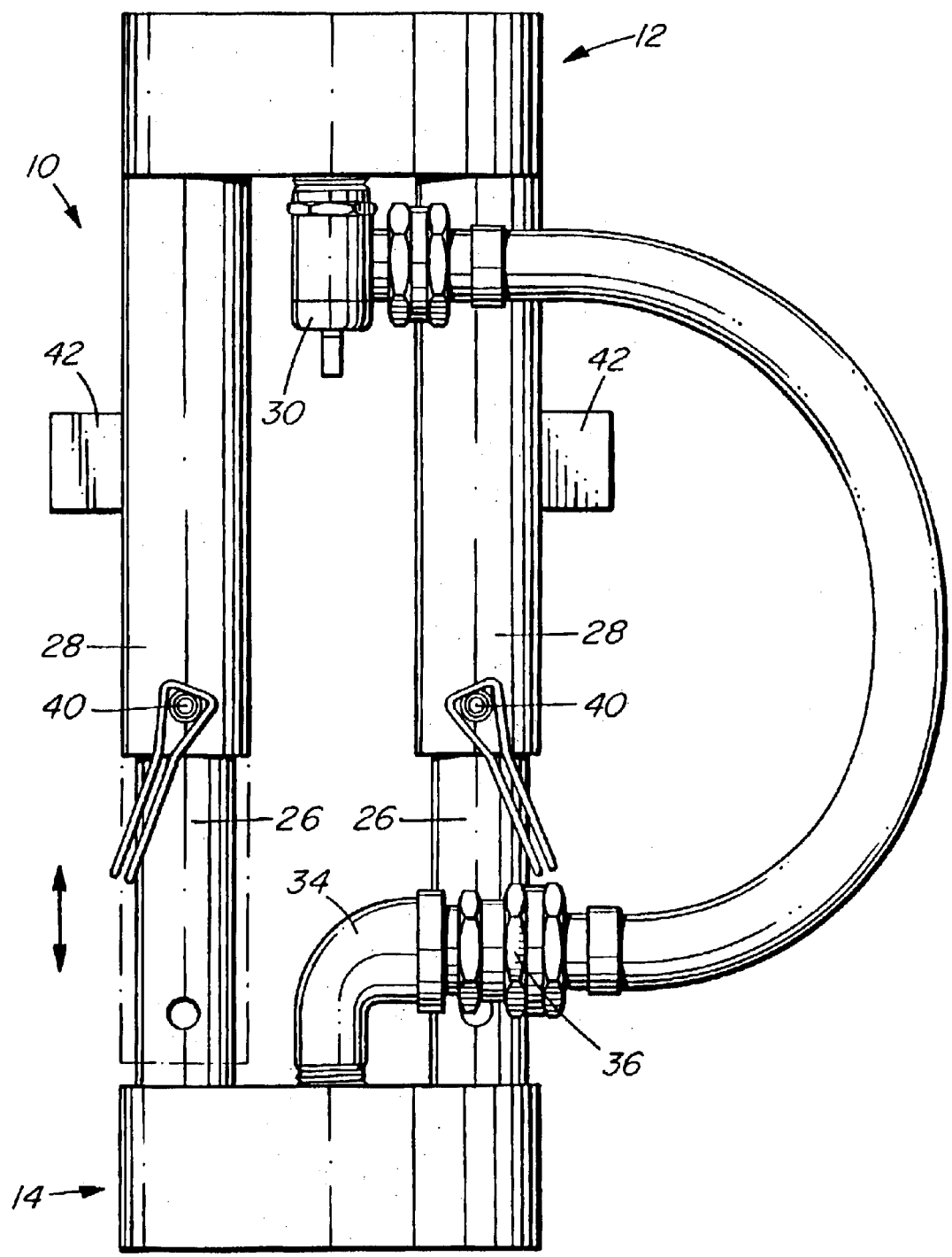
FIG. 2 shows a view in side elevation of the plumbing testing device of FIG. 1.
Figure 3:
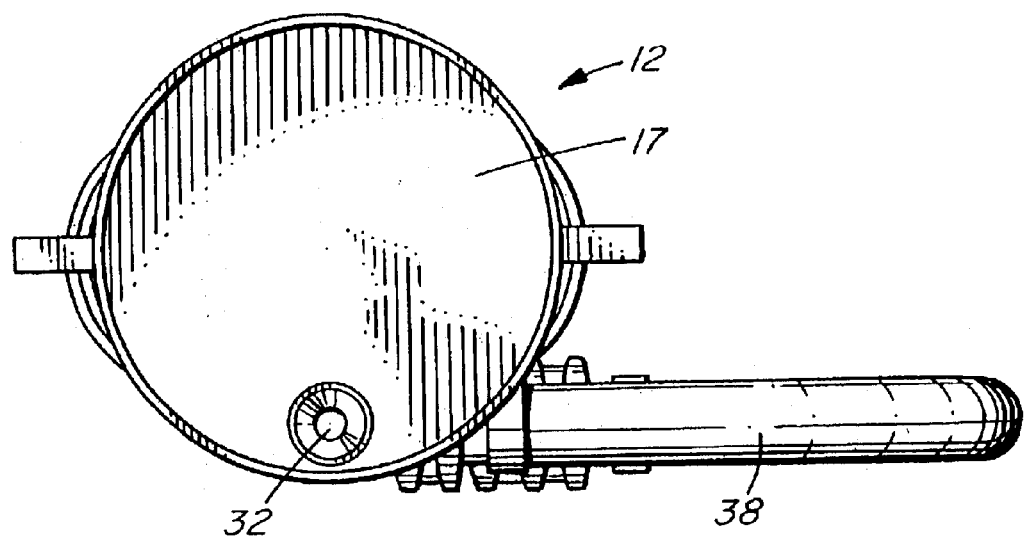
FIGS. 3 and 4 show a top plan view and an underneath plan view, respectively, of the plumbing testing device of FIGS. 1 and 2.
Figure 4:
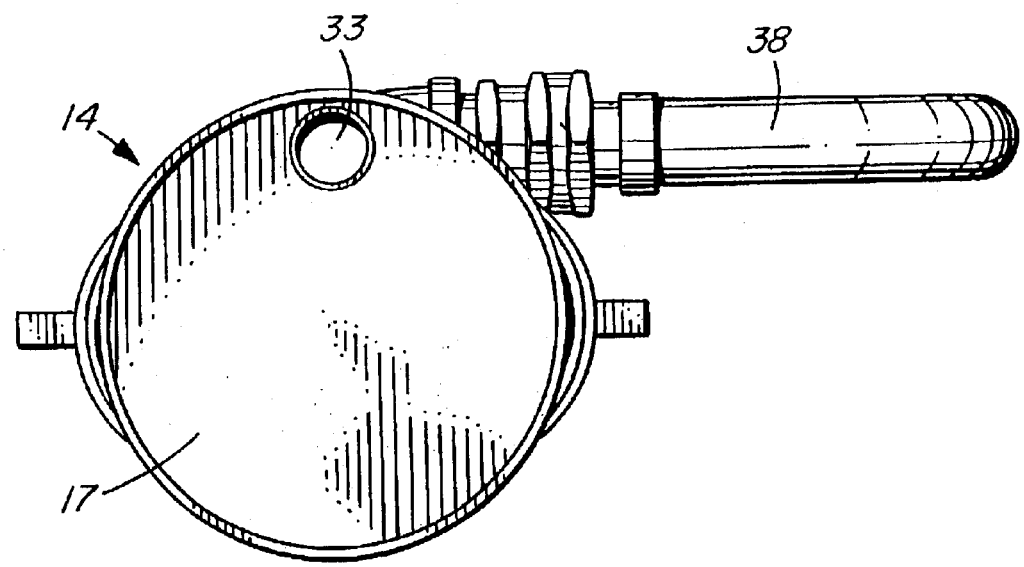

In the accompanying drawings, reference numeral 10 indicates generally a plumbing testing device which is intended for use as a test block or plug for water and air testing of drainage piping.

The plumbing testing device 10 has an upper pipe section 12 and a lower pipe section 14 which are indicated generally by reference numerals 12 and 14 and which are each formed by a section 16 comprising a short length of large diameter steel piping which is closed at one end by a metal plate 17 welded to the pipe section 16 to form a pipe stopper, the pipe sections 12 and 14 having oppositely directed open sides which, in use, face respective pipe ends 18 and 20.

A pair of conventional mechanical joint couplings 22 are provided for sealing the pipe sections 12 and 14 to the pipe ends 18 and 20.

The pipe sections 12 and 14 are connected to one another by a connection indicated generally by reference numeral 25. This connection 25 is formed by a pair of tubular members or pipes 26, which are laterally spaced from one another and which project upwardly from the lower pipe section 12, and a pair of tubular members or pipes 28 which are also laterally spaced from one another and which project downwardly from the upper pipe section 14, the tubular members 26 and 28 thus forming two telescopically interengaged pairs of tubular members.

A hosebib valve 30 is threaded into a port in the form of a hole 32 drilled and tapped into the plate 17 of the upper section, and a 90 degree elbow 34 fitting is threaded into another port in the form of a drilled and tapped hole 33 in the plate 17 of the lower pipe section 12, and a hose thread adapter 36 is threaded onto the elbow 34. A hose 38 is connected between the adaptor and the hosebib valve 30. The hose 38 is transparent to enable the user of the device 10 to observe drainage of water downwardly through the device 10, after testing has been completed. The hole 32 may be provided with a wire mesh screen (not shown) for preventing flow of debris, e.g. cement particles, through the hole 32.

Retaining pins 40 are inserted through the tubular members 26 and 28 for releasibly retaining the tubular members 26 relative to the tubular members 28. By releasing the pins 40 from the tubular members 26 and 28, the connection 25 can be longitudinally expanded and contracted to move the pipe sections 12 and 14 away from and towards one another. The pins 40 serve to releasibly retain the pipe section 12 and 14 at a predetermined spacing from one another.

Lugs 42 are welded onto the tubular members to serve as a hammer points, which may be employed if the connection 25 is otherwise difficult to collapse or to expand.

The method of the operation off the above-described plumbing testing device 10 is as follows:

The plumbing testing device 10 is included between the pipe ends 18 and 20 during installation of the piping, with the device longitudinally extended and the pins 40 inserted to maintain the device 10 in its extended condition. The joint couplings 22 are tightened onto the pipe ends 18 and 20 and the pipe sections 12 and 14 in order to seal them to one another. The valve 30 provided on the upstream pipe section 12 and the transparent flexible hose 38 allow the upstream portion of the piping system to be filled from the top or, by disconnecting the hose from the elbow 34, by air from the bottom upwards. Once the piping system has been filled and successfully tested or, if necessary, once a defective fitting in the test section of the piping system has been replaced, and with the flexible hose 38 connected to the lower pipe section 14, the valve 30 is opened to allow the test fluid to drain from the upper test portion of the piping system to the downstream piping below the plumbing test device.

When the drainage has been completed, which can be observed through the transparent hose, the mechanical joint couplings 22 are loosened from both ends of the plumbing testing device 10, and the pins 40 are removed from the tubular members 26 and 28, so as to allow the plumbing testing device 10 to be collapsed by a distance of approximately three inches. The plumbing testing device 10 can then easily be removed from between the pipe ends 18 and 20, and a replacement length of pipe (not shown) is then installed in its place.

The above-described plumbing testing device 10 may also be used in horizontal piping. To achieve maximum drainage downwardly, the installer should position the holes 32 and 33, the valve 30 and the clear flexible hose 38 at the bottom of the piping. In this condition, the hose 38 extends horizontally from the holes 32 and 33, so that it does not require digging below the device 10.

What is claimed is:

1. A plumbing testing device, comprising:

a pair of aligned pipe stoppers;

the pipe stoppers each comprising a pipe section and having open sides facing in opposite directions away from one another;

a pair of joint couplings;

a hose between the pipe stoppers;

a connection between the pipe stoppers;

the connection comprising two pairs of elongate members;

the pairs of elongate members being spaced apart laterally of one another;

the elongate members of each of the pairs projecting from respective ones of the pipe stoppers and being telescopically interengaged with one another; and retainers insertable through the elongate members for releasibly retaining the pipe stoppers at a predetermined spacing from one another.

2. A plumbing testing device as claimed in claim 1, wherein the pipe sections each have a water port, the hose connecting the water ports to one another, and the device including a valve controlling the flow of water between the pipe sections through the hose.

3. A plumbing testing device as claimed in claim 2, wherein the hose is transparent.

4. A plumbing testing device comprising:

a pair of aligned pipe stoppers;

the pipe stoppers each comprising a pipe section and having open sides facing in opposite directions away from one another;

a pair of joint couplings;

a hose between the pipe stoppers;

a connection between the pipe sections;

the connection comprising two pairs of elongate members;

the pairs of the elongate members being spaced apart laterally of one another; and the elongate members of each of the pairs projecting from respective ones of the pipe stoppers and being telescopically interengaged with one another.

5. A plumbing testing device as claimed in claim 4, wherein the pipe sections each have a water port, the hose connecting the water ports to one another, and the device including a valve controlling the flow of water between the pipe sections through the hose.

6. A plumbing testing device as claimed in claim 5, wherein the hose is transparent.

7. A plumbing testing device, comprising:

a pair of aligned pipe stoppers;

the pipe stoppers each comprising a pipe section and having open sides facing in opposite directions away from one another;

a pair of joint couplings;

a hose between the pipe stoppers;

a connection between the pipe stoppers;

the connection comprising telescopically interengaged elongate members extending from the pipe stoppers; and a retainer insertable through the elongate members for releasibly retaining the pipe stoppers at a predetermined spacing from one another.

8. A plumbing testing device as claimed in claim 7, wherein the pipe sections each have a water port, the hose connecting the water ports to one another, and the device including a valve controlling the flow of water between the pipe sections through the hose.

9. A plumbing testing device as claimed in claim 8, wherein the hose is transparent.

* * * * *